US007755296B2

(12) United States Patent
Yang et al.

(10) Patent No.: US 7,755,296 B2
(45) **Date of Patent: *Jul. 13, 2010**

(54) RESONANT INVERTER

(75) Inventors: Ta-yung Yang, Milpitas, CA (US); Jea-Sen Lin, Taipei County (TW)

(73) Assignee: System General Corp., Taipei Hsien (TW)

(*) Notice: Subject to any disclaimer, the term of this patent is extended or adjusted under 35 U.S.C. 154(b) by 477 days.

This patent is subject to a terminal disclaimer.

(21) Appl. No.: 11/688,237

(22) Filed: Mar. 19, 2007

(65) Prior Publication Data

US 2008/0232147 A1 Sep. 25, 2008

(51) Int. Cl.
*H05B 37/02* (2006.01)
*H05B 39/04* (2006.01)
*H05B 41/36* (2006.01)
*H02M 7/538* (2007.01)

(52) U.S. Cl. ....................... 315/219; 315/224; 315/307; 363/133

(58) Field of Classification Search ................... 363/37, 363/131; 315/224, 219, 307, DIG. 5
See application file for complete search history.

(56) References Cited

U.S. PATENT DOCUMENTS 4,259,614 A * 3/1981 Kohler ....................... 315/219
4,538,095 A * 8/1985 Nilssen ....................... 315/244
4,791,338 A * 12/1988 Dean et al. .................. 315/174
5,084,652 A * 1/1992 Kakitani ..................... 315/219
5,831,396 A * 11/1998 Rudolph ..................... 315/307
6,169,375 B1 * 1/2001 Moisin ....................... 315/224
6,188,553 B1 * 2/2001 Moisin ........................ 361/52
6,194,840 B1 * 2/2001 Chang .................... 315/209 R
6,222,326 B1 * 4/2001 Moisin ................... 315/209 R
6,300,722 B1 * 10/2001 Parra ...................... 315/209 R
7,436,126 B2 * 10/2008 Yang .......................... 315/224
2005/0141161 A1 * 6/2005 Usui ......................... 361/93.1

* cited by examiner

*Primary Examiner*—Bao Q Vu
*Assistant Examiner*—Jue Zhang
(74) *Attorney, Agent, or Firm*—Jianq Chyun IP Office

(57) ABSTRACT

The present invention provides a low-cost resonant inverter circuit for ballast. The resonant circuit includes a transformer connected in series with a lamp to operate the lamp. A first transistor and a second transistor are coupled to switch the resonant inverter circuit. A second winding and a third winding of the transformer are used for generating control signals in response to a switching current of the resonant inverter circuit. The transistor is turned on once the control signal is higher than a high-threshold. Next, the transistor is turned off once the control signal is lower than a low-threshold. Therefore, soft switching operation for the first transistor and the second transistor is achieved.

8 Claims, 5 Drawing Sheets

RESONANT INVERTER

BACKGROUND OF THE INVENTION

1. Field of the Invention

The present invention generally relates to a resonant inverter circuit, and more particularly to a resonant inverter or ballast.

2. Description of the Related Art

Fluorescent lamps are the most popular light sources in our daily lives. Improving the efficiency of fluorescent lamps significantly saves energy. Therefore, in recent development, how to improve the efficiency and save the power for the ballast of the fluorescent lamp is the major concern.

FIG. 1 shows a conventional inverter circuit with a resonant inverter circuit connected in series for an electronic ballast. Two switches 10 and 15 form a half-bridge inverter. The two switches 10 and 15 are complementarily switched on and off with 50% duty cycle at the desired switching frequency. An inductor 75 and a capacitor 70 form a resonant circuit to operate a fluorescent lamp 50. The fluorescent lamp 50 is connected in parallel with a capacitor 55. The capacitor 55 is operated as a start-up circuit. Once the lamp has been started up, the switching frequency is controlled to produce the required lamp voltage. A controller 5 is utilized to generate switching signals $S_1$ and $S_2$ to drive switches 10 and 15 respectively. The switch 10 is coupled to a high voltage source V+. The controller 5 is thus required to include a high-side switch driver to turn on/off the switch 10, which increases the cost of the circuit. Another drawback of this circuit is high switching loss on switches 10 and 20. The parasitic devices of the fluorescent lamp, such as the equivalent capacitance, etc., are varied in response to the temperature variation and the age of the lamp. Besides, the inductance of the inductor 75 and the capacitance of the capacitor 70 are varied during mass production. The objective of the present invention is to provide a low cost inverter circuit that can automatically achieve soft switching for reducing the switching loss and improving the efficiency of the ballast.

SUMMARY OF THE INVENTION

The present invention provides an inverter circuit for a ballast. A resonant circuit comprises a transformer connected in series with a lamp to operate a lamp. A first transistor and a second transistor are coupled to the resonant circuit for switching the resonant circuit. A first control circuit and a second control circuit are coupled to control the first transistor and the second transistor respectively. A second winding and a third winding of the transformer are utilized to provide power sources and generate control signals to the first control circuit and the second control circuit in response to the switching current of the resonant inverter circuit. The transistor is turned on once the control signal is higher than a high-threshold. The transistor is turned off once the control signal is lower than a low-threshold. The first transistor and the second transistor therefore achieve the soft switching operation.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 3~FIG. 6 show the first operation phase to fourth operation phase of the inverter according to an embodiment of the present invention.

Figure 7:
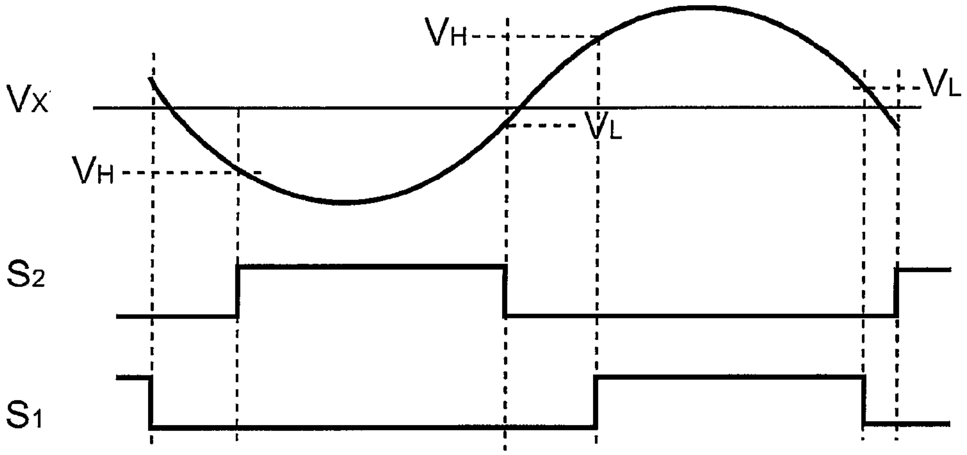

FIG. 7 shows the waveform of the inverter circuit according to an embodiment of the present invention.

Figure 8:
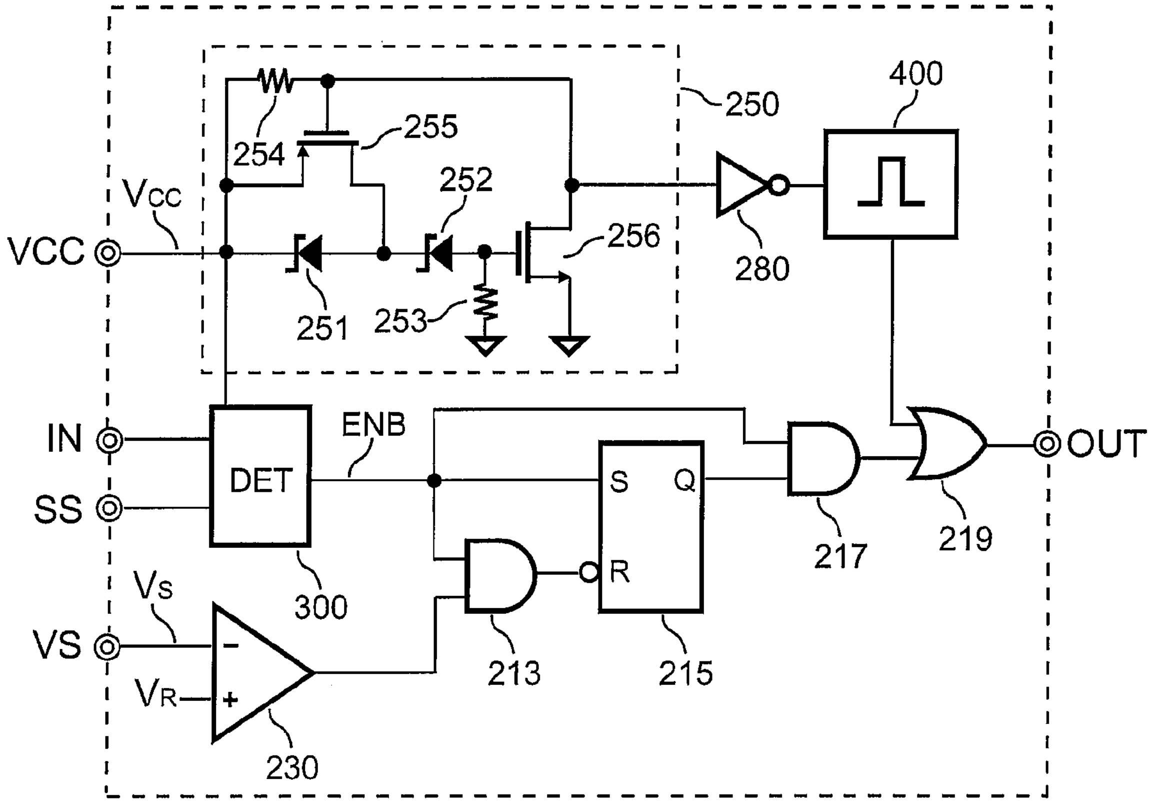

FIG. 8 shows a schematic circuit for a first control circuit and a second control circuit according to an embodiment of the present invention.

Figure 9:
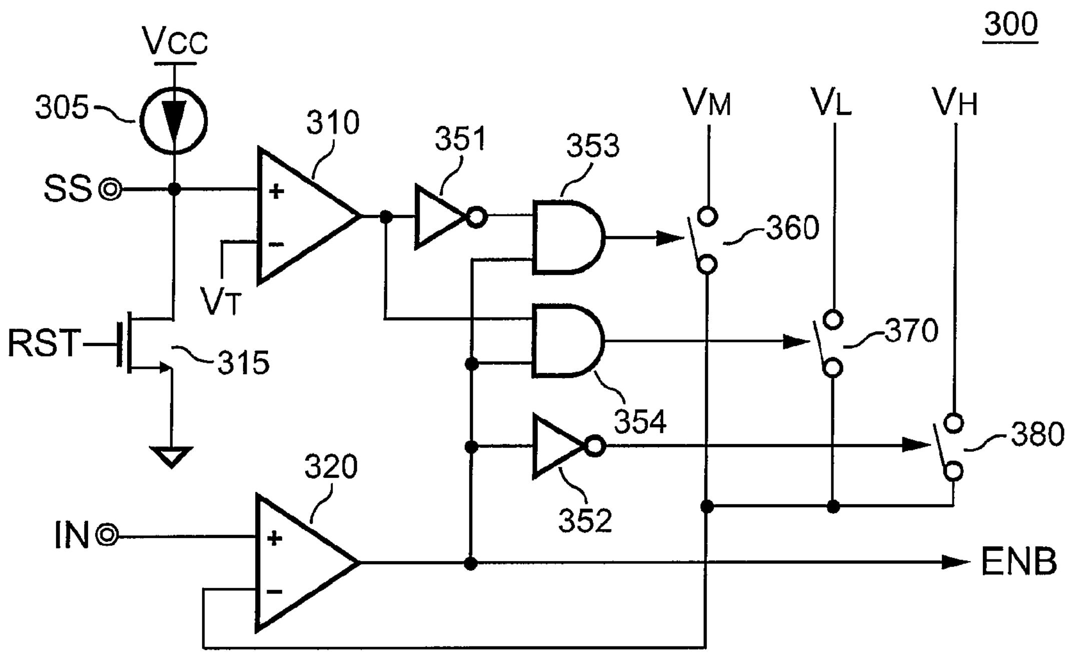

FIG. 9 shows a detection circuit according to an embodiment of the present invention.

Figure 10:
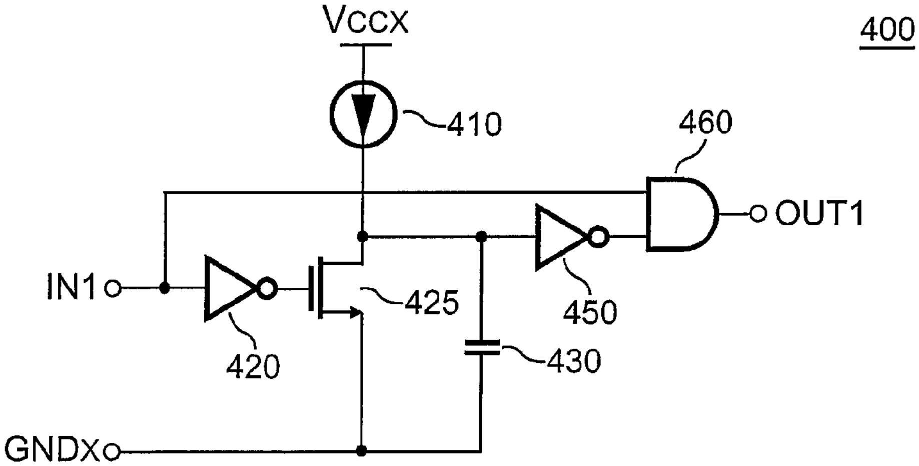

FIG. 10 shows a one-shot circuit according to an embodiment of the present invention.

DESCRIPTION OF THE PREFERRED EMBODIMENT

Figure 1:
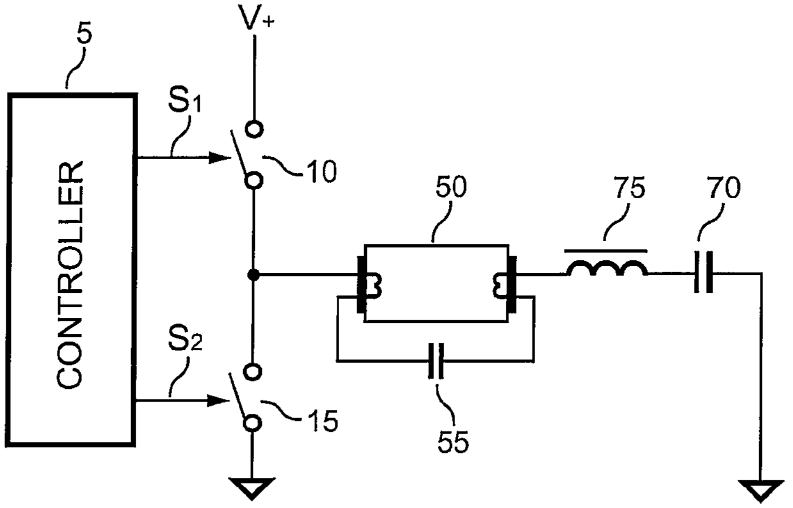
FIG. 1 (Prior Art)
FIG. 1 shows a conventional electronic ballast.
Figure 2:
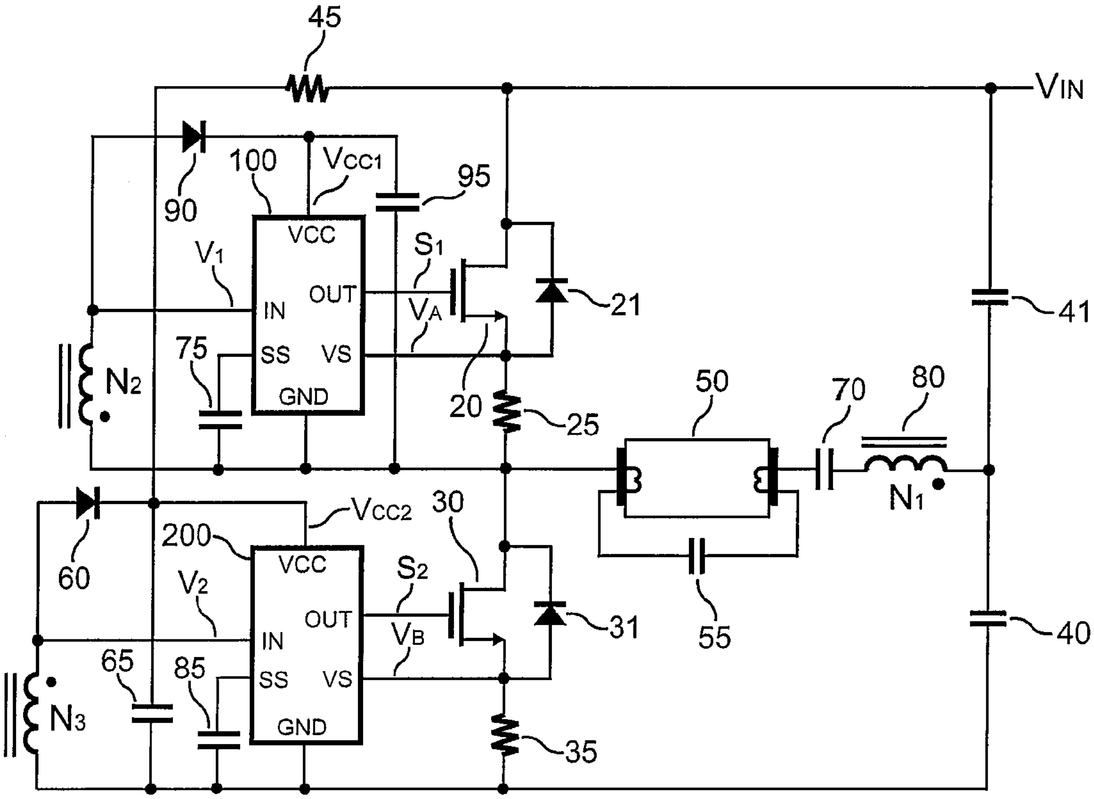
FIG. 2 is a resonant inverter circuit according to an embodiment of the present invention.
Figure 3:
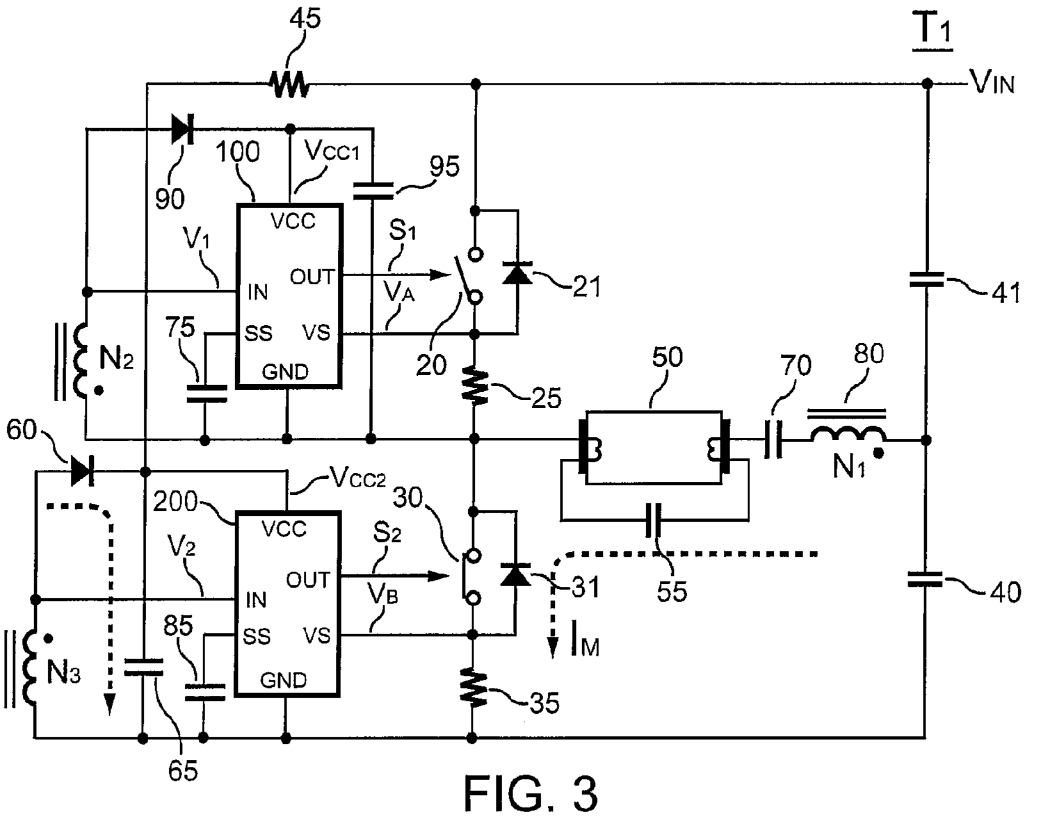
Figure 4:
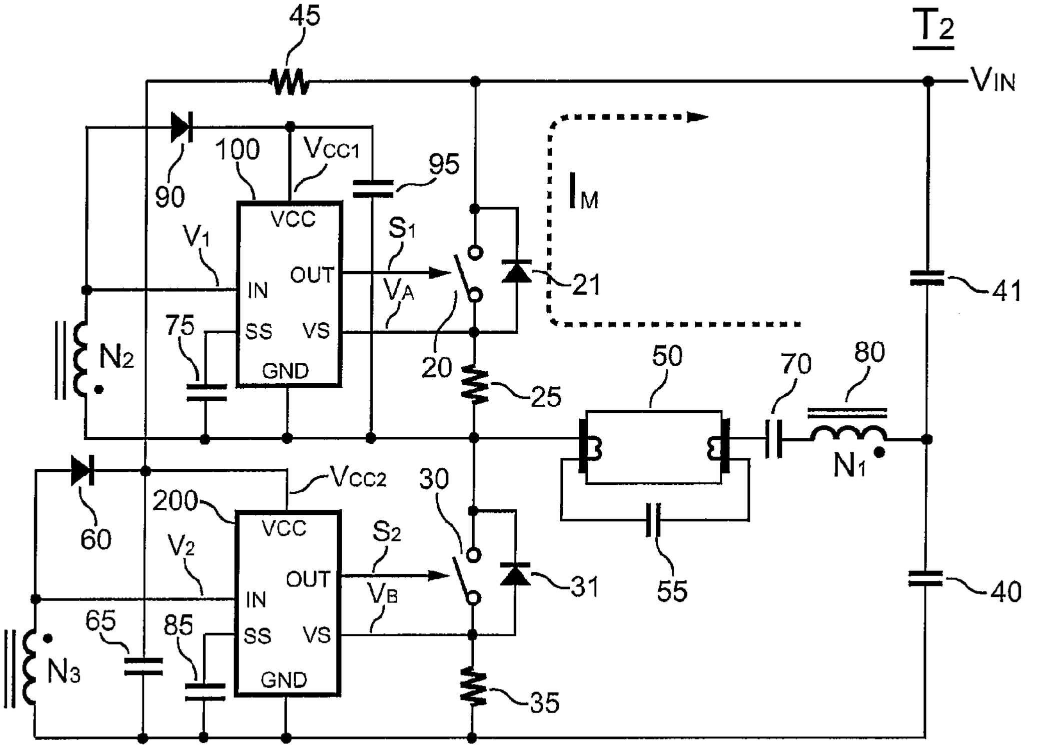
Figure 5:
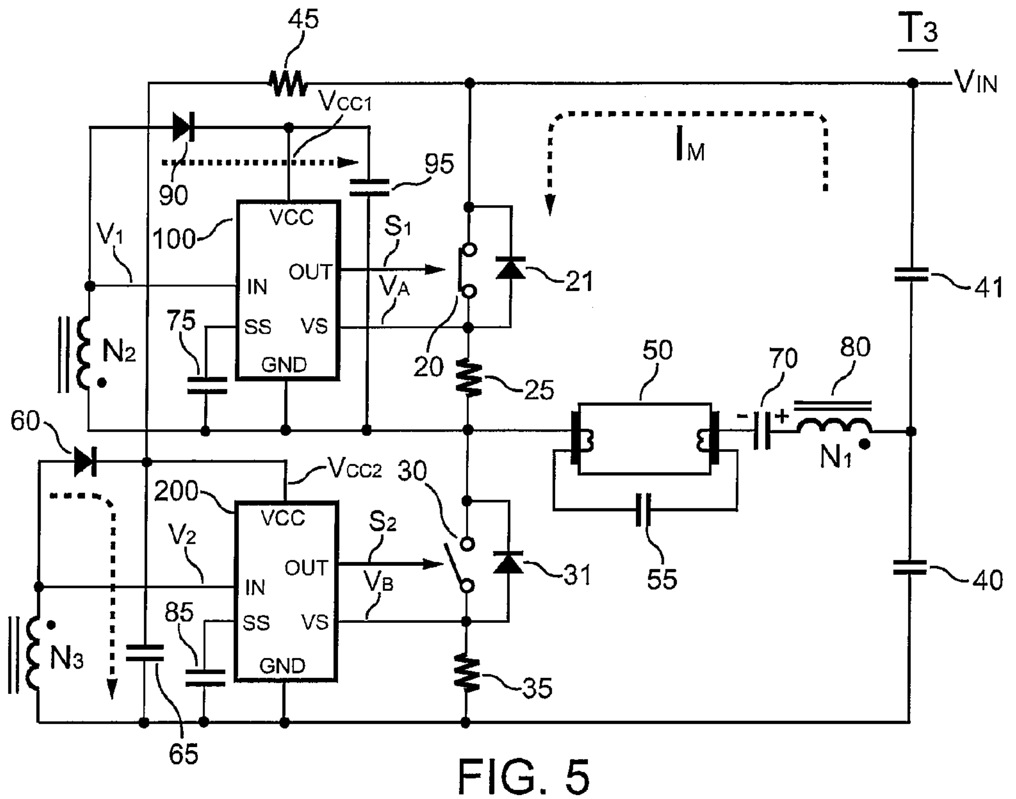
Figure 6:
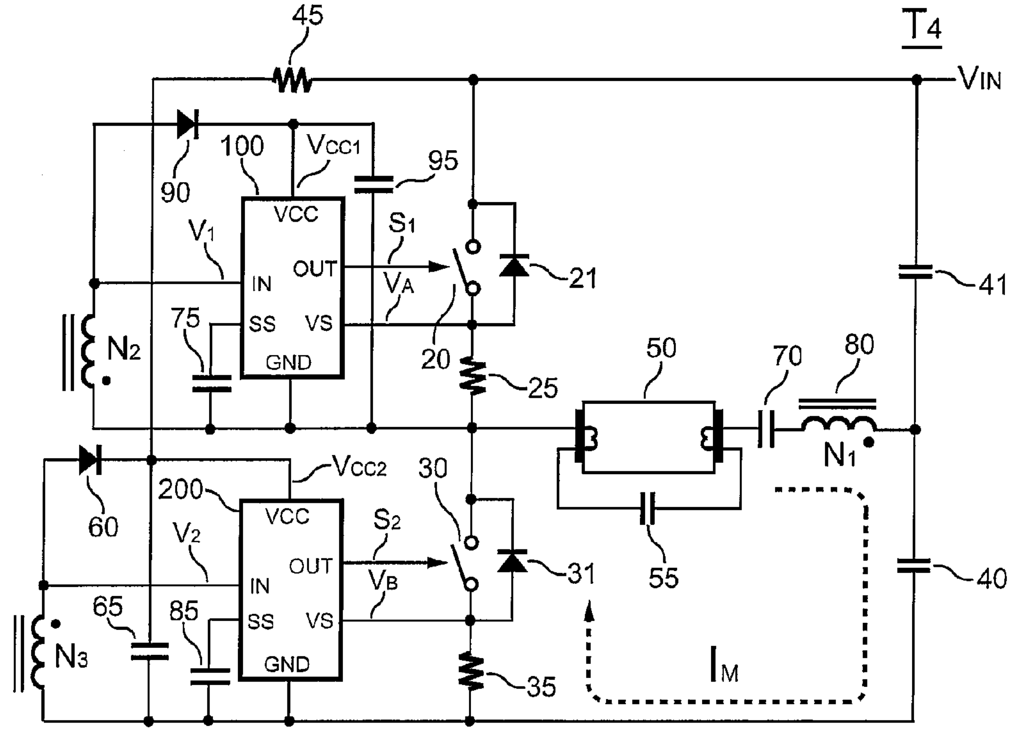

FIG. 2 shows a resonant inverter circuit according to an embodiment of the present invention. A lamp 50 is the load of the resonant inverter circuit. A resonant circuit comprises a transformer 80 and a capacitor 70 connected in series with a lamp 50 to operate the lamp 50. The resonant circuit produces a sine-wave current to operate the lamp 50. A transistor 20 is coupled to switch the resonant circuit. A resistor 25 is connected in series with the transistor 20 to detect the switching current for generating a current signal $V_A$ coupled to a terminal VS of a control circuit 100. The transistor 20 is controlled by a switching signal $S_1$. A transistor 30 is coupled to switch the resonant inverter circuit as well. A resistor 35 is connected in series with the transistor 30 to detect the switching current for generating a current signal $V_B$ coupled to a terminal VS of a control circuit 200. The transistor 30 is controlled by a switching signal $S_2$. A first winding $N_1$ of the transformer 80 is connected in series with the lamp 50 to develop the resonant inverter circuit. A second winding $N_2$ and a third winding $N_3$ of the transformer 80 are used for generating control signals $V_1$ and $V_2$ in response to the switching current of the resonant inverter circuit. Control signals $V_1$ and $V_2$ are coupled to the input terminal IN of the control circuit 100 and the control circuit 200, respectively. A diode 21 is connected in parallel with the transistor 20. A diode 31 is connected in parallel with the transistor 30. The control circuit 100 generates the switching signal $S_1$ for controlling the on/off of the transistor 20 in response to the waveform of the control signal $V_1$. The control circuit 200 generates the switching signal $S_2$ for controlling the transistor 30 in response to the waveform of the control signal $V_2$. A resistor 45 is coupled from an input voltage $V_{IN}$ to a capacitor 65 to charge the capacitor 65 once the power is applied to the resonant inverter circuit. The capacitor 65 is further connected to provide a supply voltage $V_{CC}$ to the control circuit 200. When the voltage of the capacitor 65 is higher than a start-up threshold, the control circuit 200 will start to operate. A diode 60 is coupled from the third winding $N_3$ of the transformer 80 to the capacitor 65 to provide power source to the control circuit 200 once the switching of the resonant inverter circuit is started. The second winding $N_2$ of the transformer 80 provides another supply voltage to the control circuit 100 and a capacitor 95 via a diode 90. A capacitor 75 is connected to a soft-start terminal SS of the control circuit 100. Another capacitor 85 is connected to the soft-start terminal SS of the control circuit 200. Both the capacitor 75 and the capacitor 85 provide a soft-start period to achieve soft start operation of the resonant inverter circuit when the power is turned on.

FIG. 3~FIG. 6 show operation stages of the switching circuit. When the transistor 30 is turned on (the first operation stage $T_1$), a switching current $I_M$ will flow via the transformer 80 to generate the control voltage $V_2$. Meanwhile, the capacitor 65 is charged via the diode 60. Once the switching current $I_M$ is decreased and the control voltage $V_2$ is lower than a low-threshold $V_L$, the transistor 30 will be turned off. After that, the circular current of the resonant inverter circuit will turn on the diode 21. The circular current is produced by the energy stored in the transformer 80. The energy of the resonant inverter circuit will be circulated (the second operation stage $T_2$). The switching current $I_M$ flowing via the transformer 80 will generate the control signal $V_1$. If the control signal $V_1$ is higher than a high-threshold $V_H$, the control circuit 100 will enable the switching signal $S_1$ to turn on the transistor 20. Since the diode 21 is conducted at this moment, as the transistor 20 is turned on, the soft switching operation is therefore achieved (the third operation stage $T_3$). When the switching current $I_M$ is decreased and the control voltage $V_1$ is lower than the low-threshold $V_L$, the transistor 20 will be turned off. Meanwhile, the circular current of the resonant inverter circuit will turn on the diode 31 (the fourth operation stage $T_4$). Therefore, as the transistor 30 is turned on, the soft switching operation of the transistor 30 is achieved.

FIG. 7 shows the waveform of operation stages, in which $V_X$ represents $V_1$ and $V_2$. The switching signal $S_1$ is enabled once the control signal $V_1$ is higher than the high-threshold $V_H$. After a quarter resonant period of the resonant inverter circuit, the switching signal $S_1$ is disabled once the control signal $V_1$ is lower than the threshold $V_L$. The resonant frequency $f_R$ of the resonant inverter circuit is given by, $$f_R = \frac{1}{2\pi\sqrt{LC}} \tag{1}$$

where the L denotes the inductance of the first winding $N_1$ of the transformer 80; C denotes the equivalent capacitance of the lamp 50 and the capacitor 70.

The switching signal $S_2$ is enabled once the control signal $V_2$ is higher than the high-threshold $V_H$. Besides, after the quarter resonant period of the resonant inverter circuit, the switching signal $S_2$ is disabled once the control signal $V_2$ is lower than the low-threshold $V_L$.

FIG. 8 shows a schematic circuit for the control circuit 100 and the control circuit 200 according to an embodiment of the present invention. A detection circuit 300 is coupled to an input terminal IN to detect the control signal for generating an enable signal ENB. The enable signal ENB is enabled once the control signal is higher than the high-threshold $V_H$. A comparator 230 is coupled to the terminal VS for producing a reset signal. The reset signal is generated once the switching current is higher than an over-current threshold $V_R$. The enable signal ENB is connected to an input of an AND gate 213 and a set-input of a flip-flop 215. An output of the comparator 230 is connected to another input of the AND gate 213. An output of the AND gate 213 is connected to a reset-input of the flip-flop 215. An output of the flip-flop 215 is connected to an input of an AND gate 217. Another input of the AND gate 217 receives the enable signal ENB. An output of the AND gate 217 is further connected to an input of an OR gate 219. Another input of the OR gate 219 is coupled to an output of a one-shot circuit 400 to receive a one-shot signal. An output of the OR gate 219 generates the switching signal. An input of the one-shot circuit 400 is connected to a start-up signal via an inverter 280. Two zener diodes 251 and 252, two transistors 255 and 256 and two resistors 253 and 254 develop a start-up circuit 250 to generate the start-up signal in response to the supply voltage $V_{CC}$. The zener diodes 251 and 252 determine a start-up threshold. The start-up circuit 250 will enable the start-up signal (at a logic-low level) when the supply voltage $V_{CC}$ is higher than the start-up threshold. In the mean time, the start-up signal will turn on the transistor 255 to short circuit the zener diode 251 and provide a turn-off threshold. The turn-off threshold is determined by the zener diode 252. Therefore, the start-up signal is disabled (at a logic-high level) once the supply voltage $V_{CC}$ is lower than the turn-off threshold. The switching signal is therefore generated in response to the one-shot signal, the enable signal ENB, and the reset signal.

FIG. 9 shows the schematic circuit of the detection circuit 300 according to an embodiment of the present invention. A current source 305 is applied to the soft-start terminal SS. The soft-start terminal SS is coupled to a comparator 310 to compare with a threshold voltage $V_T$. A transistor 315 is connected to the soft-start terminal SS. The transistor 315 is turned on by a power-on reset signal RST to discharge the external capacitor connected to the soft-start terminal SS, such as the capacitors 75 or 85. The current source 305 associates with the external capacitor providing the soft-start period to achieve soft start operation of the resonant inverter circuit when the power is applied. A comparator 320 is coupled to the input terminal IN to receive the control signal for generating the enable signal ENB. The enable signal ENB is further connected to an input of an AND gate 353, an input of an AND gate 354 and an input of an inverter 352. Another input of the AND gate 353 is coupled to the output of the comparator 310 via an inverter 351. Another input of the AND gate 354 is coupled to the output of the comparator 310 as well. The inverter 352 is used to control a switch 380. The AND gate 354 is used to control a switch 370. The AND gate 353 is used to control a switch 360. The switch 380 is coupled to the comparator 320 and the high-threshold $V_H$. The comparator 320 compares the control signal with the high-threshold $V_H$ when the enable signal ENB is disabled. The switch 370 is coupled to the comparator 320 and the low-threshold $V_L$. The comparator 320 will compare the control signal with the low-threshold $V_L$ when the enable signal ENB is enabled. Besides, the switch 360 is coupled to the comparator 320 and a middle-threshold $V_M$. The comparator 320 will compare the control signal with the middle-threshold $V_M$ once the enable signal ENB is enabled and during the soft-start period. The level of the high-threshold $V_H$ is higher than the level of the middle-threshold $V_M$. The level of the middle-threshold $V_M$ is higher than the level of the low-threshold $V_L$. Therefore the pulse width of the switching signal is reduced during the soft-start period. FIG. 10 is the one-shot circuit 400, in which the current source 410 and the capacitor 430 determine an enable period of the one-shot signal.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A resonant inverter circuit, comprising:

a resonant circuit, comprising a capacitor and a transformer, for operating a lamp; wherein said transformer comprises a first winding connected in series with said lamp, a second winding and a third winding for generating control signals in response to a switching current of said resonant inverter circuit;

a first control circuit and a second control circuit, for respectively generating a first switching signal and a second switch signal in response to control signals, wherein said first switching signal or said second switch signal is enabled once said control signal is higher than a high-threshold, and said switching signal is disabled once said control signal is lower than a low-threshold; and wherein a level of said high-threshold is higher than a level of said low-threshold; and a first transistor and a second transistor, coupled to switch the resonant inverter circuit respectively in response to said first switching signal and said second switch signal; wherein said second winding and said third winding of said transformer are coupled to generate supply voltages via diodes and capacitors to provide power sources to said first control circuit and said second control circuit.

2. A resonant inverter circuit, comprising:

a resonant circuit, comprising a capacitor and a transformer, for operating a lamp; wherein said transformer comprises a first winding connected in series with said lamp, a second winding and a third winding for generating control signals in response to a switching current of said resonant inverter circuit;

a first control circuit and a second control circuit, for respectively generating a first switching signal and a second switch signal in response to control signals, wherein said first control circuit and said second control circuit respectively include a soft-start terminal coupled to produce a soft-start period, and a pulse width of said first switching signal or said second switch signal is reduced during said soft-start period; and a first transistor and a second transistor, coupled to switch the resonant inverter circuit respectively in response to said first switching signal and said second switch signal; wherein said second winding and said third winding of said transformer are coupled to generate supply voltages via diodes and capacitors to provide power sources to said first control circuit and said second control circuit.

3. A resonant inverter circuit, comprising:

a resonant circuit, comprising a capacitor and a transformer, for operating a lamp; wherein said transformer comprises a first winding connected in series with said lamp, a second winding and a third winding for generating control signals in response to a switching current of said resonant inverter circuit;

a first control circuit and a second control circuit, for respectively generating a first switching signal and a second switch signal in response to control signals, wherein said first control circuit and said second control circuit respectively further comprise:

a detection circuit, coupled to said transformer to generate an enable signal in response to said control signal, wherein said enable signal is enabled once said control signal is higher than said high-threshold;

a reset comparator, coupled to detect said switching current for producing a reset signal to reset said first switching signal or said second switch signal respectively once said first switching signal or said second switch signal is higher than an over-current threshold;

a start-up circuit, coupled to detect said supply voltage to generate a start-up signal when said supply voltage is higher than a start-up threshold; and a one-shot circuit, coupled to said start-up circuit to generate a one-shot signal in response to said start-up signal, wherein said first switching signal or said second switch signal is generated in response to said one-shot signal and said enable signal; and a first transistor and a second transistor, coupled to switch the resonant inverter circuit respectively in response to said first switching signal and said second switch signal; wherein said second winding and said third winding of said transformer are coupled to generate supply voltages via diodes and capacitors to provide power sources to said first control circuit and said second control circuit.

4. The resonant inverter circuit as claimed in claim 3, wherein the detection circuit comprises:

a comparator, coupled to said control signal to generate said enable signal;

a first switch, coupled to said comparator and said high-threshold, wherein said comparator compares said control signal with said high-threshold when said enable signal is disabled;

a second switch, coupled to said comparator and said low-threshold, wherein said comparator compares said control signal with said low-threshold when enable signal is enabled; and a third switch, coupled to said comparator and a middle-threshold, wherein said comparator compares said control signal with said middle-threshold once said enable signal is enabled and during said soft-start period, and wherein the level of said high-threshold is higher than a level of said middle-threshold, and the level of said middle-threshold is higher than the level of said low-threshold.

5. A resonant inverter, comprising:

a resonant circuit, formed by a load and a transformer comprising a winding connected in series with said load, a second winding and a third winding for generating control signals in response to a switching current of said resonant circuit;

a first control circuit and a second control circuit, for respectively generating a first switching signal and a second switch signal in response to said control signals, wherein said first switching signal or said second switch signal is enabled once said control signal is higher than a high-threshold and said switching signal is disabled once said control signal is lower than a low-threshold, wherein the level of said high-threshold is higher than the level of said low-threshold; and a first transistor and a second transistor, coupled to switch said resonant circuit respectively in response to said first switching signal and said second switch signal, wherein said transformer is coupled to provide power source for generating said first switching signal and said second switch signal.

6. A resonant inverter, comprising:

a resonant circuit, formed by a load and a transformer comprising a winding connected in series with said load, a second winding and a third winding for generating control signals in response to a switching current of said resonant circuit;

a first control circuit and a second control circuit, for respectively generating a first switching signal and a second switch signal in response to said control signals, wherein said first control circuit and said second control circuit are coupled to produce a soft-start period, and wherein the pulse width of said first switching signal or said second switch signal is reduced during said soft-start period; and a first transistor and a second transistor, coupled to switch said resonant circuit respectively in response to said first switching signal and said second switch signal, wherein said transformer is coupled to provide power source for generating said first switching signal and said second switch signal.

7. A resonant inverter, comprising:

a resonant circuit, formed by a load and a transformer comprising a winding connected in series with said load, a second winding and a third winding for generating control signals in response to a switching current of said resonant circuit;

a first control circuit and a second control circuit, for respectively generating a first switching signal and a second switch signal in response to said control signals, wherein said first control circuit and said second control circuit respectively comprise:

a detection circuit, coupled to said transformer to generate an enable signal in response to said control signal, wherein said enable signal is enabled once said control signal is higher than said high-threshold; and a start-up circuit, coupled to detect a supply voltage to generate a start-up signal when said supply voltage is higher than a start-up threshold, wherein said first switching signal or said second switch signal is generated in response to said start-up signal and said enable signal; and a first transistor and a second transistor, coupled to switch said resonant circuit respectively in response to said first switching signal and said second switch signal, wherein said transformer is coupled to provide power source for generating said first switching signal and said second switch signal.

8. The resonant inverter as claimed in claim 7, wherein said detection circuit, comprises:

a comparator, for generating said enable signal;

a first switch, coupled to said comparator and said high-threshold, wherein said comparator compares said control signal with said high-threshold when said enable signal is disabled;

a second switch, coupled to said comparator and said low-threshold, wherein said comparator compares said control signal with said low-threshold when said enable signal is enabled; and a third switch, coupled to said comparator and a middle-threshold, wherein said comparator compares said control signal with said middle-threshold once said enable signal is enabled and during said soft-start period, and wherein the level of said high-threshold is higher than the level of said middle-threshold; the level of said middle-threshold is higher than the level of said low-threshold.

* * * * *